United States Patent
Borgerson et al.

(10) Patent No.: US 7,743,677 B2
(45) Date of Patent: Jun. 29, 2010

(54) POWERTRAIN WITH TORQUE CONVERTER AND AXIALLY COMPACT SEVEN SPEED DUAL CLUTCH TRANSMISSION

(75) Inventors: James B. Borgerson, Ann Arbor, MI (US); Simon P. Fitzgerald, Glenwood (GB)

(73) Assignee: GM Global Technology Operations, Inc., Detroit, MI (US)

( * ) Notice: Subject to any disclaimer, the term of this patent is extended or adjusted under 35 U.S.C. 154(b) by 583 days.

(21) Appl. No.: 11/680,657

(22) Filed: Mar. 1, 2007

(65) Prior Publication Data

US 2008/0047379 A1   Feb. 28, 2008

Related U.S. Application Data

(63) Continuation-in-part of application No. 11/466,479, filed on Aug. 23, 2006, now Pat. No. 7,669,497.

(51) Int. Cl.
*F16H 3/08* (2006.01)
(52) U.S. Cl. ............... 74/331; 74/329; 74/330
(58) Field of Classification Search ........... 74/329–331, 74/340
See application file for complete search history.

(56) References Cited

U.S. PATENT DOCUMENTS

| 4,461,188 | A * | 7/1984 | Fisher | 74/330 |
|---|---|---|---|---|
| 6,209,407 | B1 * | 4/2001 | Heinzel et al. | 74/331 |
| 6,250,171 | B1 * | 6/2001 | Sperber et al. | 74/331 |
| 6,755,089 | B2 * | 6/2004 | Hirt | 74/329 |
| 6,958,028 | B2 * | 10/2005 | Janson et al. | 74/331 |
| 7,070,534 | B2 * | 7/2006 | Pelouch | 74/331 |
| 7,225,696 | B2 * | 6/2007 | Gitt | 74/340 |
| 2003/0121343 | A1 * | 7/2003 | Berger et al. | 74/340 |
| 2005/0000307 | A1 * | 1/2005 | Gumpoltsberger | 74/331 |
| 2005/0081661 | A1 * | 4/2005 | Kim | 74/333 |
| 2006/0025272 | A1 * | 2/2006 | Pelouch | 475/214 |
| 2008/0047378 | A1 * | 2/2008 | Borgerson et al. | 74/331 |

\* cited by examiner

*Primary Examiner*—David D Le
*Assistant Examiner*—Derek D Knight

(57) ABSTRACT

A powertrain having a torque converter, friction input shifting clutches and shared driving gears has an axially compact design, packages a transmission pump between the torque converter and a clutch hub and achieves seven forward speed ratios utilizing four back-to-back synchronizers.

16 Claims, 3 Drawing Sheets

| GEAR | FRICTION CLUTCHES | | BACK-TO-BACK SYNCHRO A | | BACK-TO-BACK SYNCHRO B | | BACK-TO-BACK SYNCHRO C | | BACK-TO-BACK SYNCHRO D | |
|---|---|---|---|---|---|---|---|---|---|---|
| | CO | CE | A1 | A3 | B2 | BR | C5 | C7 | D6 | D4 |
| REV | | X | | | | X | | | | |
| N | | | | | | | | | | |
| 1ST | X | | X | | | | | | | |
| 2ND | | X | | | X | | | | | |
| 3RD | X | | | X | | | | | | |
| 4TH | | X | | | | | | | | |
| 5TH | X | | | | | | X | | | |
| 6TH | | X | | | | | | | X | |
| 7TH | X | | | | | | | X | | |

FIG. 2

POWERTRAIN WITH TORQUE CONVERTER AND AXIALLY COMPACT SEVEN SPEED DUAL CLUTCH TRANSMISSION

CROSS REFERENCE TO CO-PENDING APPLICATION

This patent application is a continuation-in-part of patent application Ser. No. 11/466,479, filed on Aug. 23, 2006, now U.S. Pat. No. 7,669,497.

TECHNICAL FIELD

The invention relates to a powertrain having a power source, a torque converter and a compact seven speed transmission with two friction shifting clutches.

BACKGROUND OF THE INVENTION

Dual clutch transmissions (DCTs) have been designed with friction launch clutches that connect the output of a torque converter to a lay shaft transmission. Dual clutch transmissions are known for their sporty, performance-oriented characteristics. Dual clutch transmissions typically exhibit good fuel economy due to good gear mesh efficiency and ratio selection flexibility. Synchronizers are typically used to engage gears with the countershafts to complete power flow from the engaged input clutch to an output shaft. The synchronizers have low spin losses; thus, overall operating efficiency is enhanced. However, dual clutch transmissions have some specific design considerations. For example, due to the high heat that can be generated during slip, the shifting clutches must be of a relatively large size. Shudder and oil life durability must also be addressed. Furthermore, cooling circuits for the friction shifting clutches are typically relatively complex due to the heat dissipation requirements of these large clutches. Finally, because lay shaft or countershaft transmissions typically have many sets of axially-aligned, intermeshing gears, the overall axial length of countershaft transmissions may limit there use in some vehicle designs.

SUMMARY OF THE INVENTION

A powertrain having a torque converter and dual shifting friction clutches connectable to first and second concentric intermediate shafts combines the smoothness and ratio-boosting effects of a torque converter with the low spin losses associated with synchronizers used in dual clutch designs, while preferably providing seven fixed forward speed ratios in an axially compact design. Several aspects of the powertrain contribute to the minimization of axial length. For example, driving gears connected for common rotation with the intermediate shafts intermesh with driven input gears connectable for rotation with each of the respective countershafts, thus functioning as shared driving gears. Preferably, back-to-back synchronizer pairs are supported on the countershafts between adjacent intermeshing aligned gear sets such that only four back-to-back synchronizer pairs are necessary and only four synchronizer selection devices are required to control engagement of the four pairs. Additionally, a parking gear is preferably connected for common rotation with one of the countershafts such that it is radially-aligned with an intermeshing output gear set. (A radial plane is in a plane encompassing radii of the driving or driven gears, perpendicular to the axis of rotation of the input member, output member, intermediate shafts and countershafts in the transmission. Accordingly, as used herein, components that are "radially-aligned" are aligned in a radial plane.) Furthermore, positioning of a transmission oil pump between the torque converter and the first and second friction shifting clutches allows a clutch hub supporting the friction shifting clutches to be configured with clutch hub passages for routing oil delivered from the pump to the friction shifting clutches.

Specifically, within the scope of the invention, the powertrain includes a power source and a torque converter that operatively connects the power source with a transmission input member. First and second friction shifting clutches are alternately selectively engagable to operatively connect the transmission input member with first and second concentric intermediate shafts, respectively. A first input driving gear is connected for common rotation with the first intermediate shaft and intermeshes with a first pair of driven input gears that are each connectable for common rotation to a different respective one of the countershafts to selectively transfer torque to the respective countershaft when the first friction input clutch is engaged. Furthermore, a second input driving gear is connected for common rotation with the second intermediate shaft and intermeshes with a second pair of input gears each connectable for common rotation with a different respective one of the countershafts to selectively transfer torque to the respective countershaft when the second friction input clutch is engaged. Thus, when torque is provided through either of the friction clutches to the countershafts, shared driving gears on each of the countershafts transfer the torque to one of the countershafts, depending on synchronizer engagements. Preferably, the first countershaft includes two input driving gears and the second countershaft has two other input driving gears so that four intermeshing aligned gear sets are used for input of torque from the first and second friction shifting clutches. Preferably two output gear sets are utilized, including a first output gear set that has a first output driving gear connected for common rotation with the first countershaft and a first output driven gear connected for common rotation with the output member that continuously intermeshes with the first output driving gear. Similarly, the second output gear set has a second output driving gear connected for common rotation with a second countershaft and a second output driven gear connected for common rotation with the output member that continuously intermeshes with the second output driving gear. Accordingly, the input and output driving gears and the input and output driven gears thereby form six sets of intermeshing aligned gears. By utilizing the four back-to-back synchronizers and selectively engaging the friction shifting clutches, seven forward speed ratios and a reverse speed ratio are achieved.

Unique packaging of the transmission oil pump allows simplified routing of clutch and lubrication oil and compact piloting of a clutch hub that supports the dual friction shifting clutches. Specifically, the clutch hub is configured with clutch hub passages for routing oil delivered from the transmission oil pump to the first and second friction shifting clutches. Preferably, a stationary clutch hub support member at least partially supports the clutch hub and is configured with clutch hub support member passages that are in fluid communication with the clutch hub passages so that oil may be routed from the transmission oil pump to the friction shifting clutches through the stationary clutch hub support member. The transmission oil pump is preferably radially-inward of and partially surrounded by the stationary clutch hub support member. Preferably, a stator support shaft connects a stator portion of the torque converter with the clutch hub support member. The oil pump is positioned radially-outward of the stator support shaft. Preferably the stator support shaft is configured with stator support shaft passages that are in fluid communication with the oil pump to route oil delivered from the oil pump to the torque converter.

The above features and advantages and other features and advantages of the present invention are readily apparent from the following detailed description of the best mode for carrying out the invention when taken in connection with the accompanying drawings.

BRIEF DESCRIPTION OF THE DRAWINGS

FIG. 2 is a table showing an engagement schedule of the friction shifting clutches and synchronizers in the powertrain of FIG. 1 to achieve seven forward speed ratios and a reverse speed ratio.

DESCRIPTION OF THE PREFERRED EMBODIMENT

Figure 1:
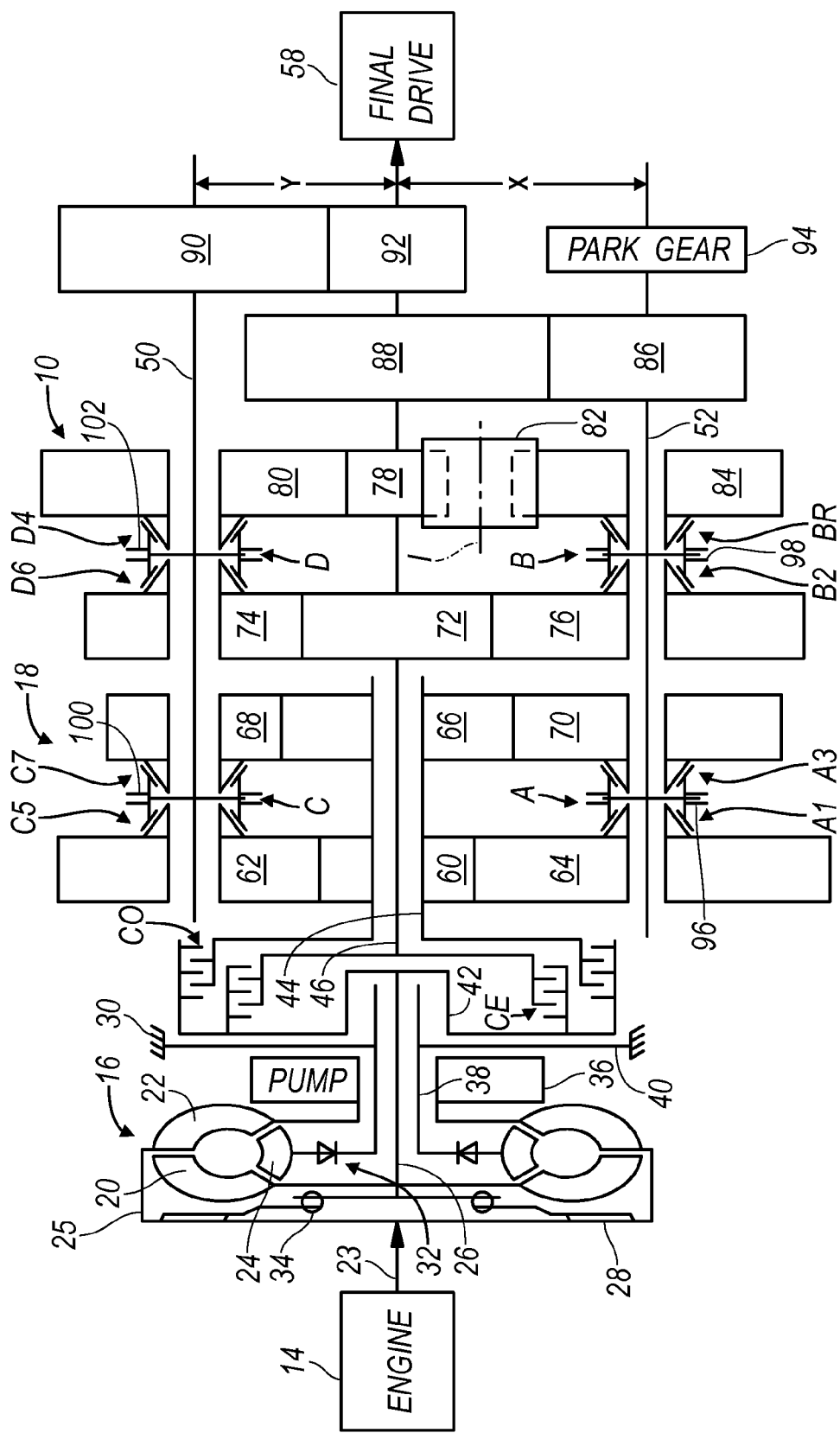
FIG. 1 is a schematic illustration of a first embodiment of a powertrain with an engine, a torque converter, a transmission with dual friction shifting clutches, and an oil pump positioned between the torque converter and the friction shifting clutches.

Referring to the drawings, wherein like reference numbers represent the same or corresponding parts throughout the several views, there is shown in FIG. 1 a powertrain 10 for a vehicle (not shown). The powertrain 10 includes a power source or engine 14, a torque converter 16 and a transmission 18. The torque converter 16 includes a turbine portion 20, a pump portion 22, and a stator portion 24. An engine output shaft 23 is connected for rotation with a hub member 25 that is connected to the pump portion 22. The turbine portion 20 is connected with a transmission input member 26. A fluid coupling between the pump portion 22 and the turbine portion 20 thus operatively connects the engine 14 with the transmission input member 26. The transmission input member 26 is preferably in the nature of a shaft. Selective engagement of a torque converter clutch 28 allows the engine 14 to be directly connected with the input member 26, bypassing the torque converter 16. Preferably, the torque converter clutch 28 is electronically controlled and may be enhanced with a plurality of clutch plates to provide a large clutch torque capacity, thus making the converter clutch 28 able to transmit a large amount of torque. The stator portion 24 is grounded to a stationary member, such as the transmission housing 30, through a typical one-way clutch 32. A damper 34 is operatively connected to the torque converter clutch 28 for absorbing vibration. A transmission oil pump 36 is operatively connected for rotation with the pump portion 22. Support for the pump 36 and fluid communication from the pump 36 to the transmission 18 and to the torque converter 16 will be discussed hereinafter. Briefly, a stator support shaft 38 supports the stator and is located radially-inward of the pump 36. The stator support shaft 38 operatively supports the stator portion 24 and is connected with a stationary clutch hub support member 40 that is grounded to the transmission housing 30. A clutch hub 42 operatively connects the input member 26 with first and second concentric intermediate shafts 44, 46 by selective engagement of first and second friction shifting clutches CO and CE, respectively.

The transmission 18 further includes a first countershaft 50 and a second counter shaft 52 which are axially-spaced from and generally parallel with the intermediate shafts 44 and 46.

Six aligned, intermeshing gear sets are utilized to transfer torque from the intermediate shafts 44, 46 via the countershafts 50, 52 to an output member 56 (preferably in the form of a shaft) to establish multiple speed ratios between the input member 26 and the output member 56. The output member 56 is connected to a final drive mechanism 58 which may be connected to vehicle wheels (not shown).

A first intermeshing gear set includes gears 60, 62 and 64. The gear 60 is a shared input driving gear that is connected for common rotation with the intermediate shaft 44 and continuously intermeshes with both gears 62 and 64. The gear 62 is rotatable about the first countershaft 50 and is selectively connectable therewith. The gear 64 is rotatable about the second countershaft 52 and is selectively connectable therewith.

A second intermeshing gear set includes gears 66, 68 and 70. The gear 66 is connected for common rotation with the intermediate shaft 44 and continuously intermeshes with both gears 68 and 70. The gear 68 is rotatable about and selectively connectable with the countershaft 50. The gear 70 is rotatable about and selectively connectable with the second countershaft 52.

A third intermeshing gear set includes gears 72, 74 and 76. The gear 72 is connected for common rotation with the intermediate shaft 46 and continuously intermeshes with both gears 74 and 76. The gear 74 is rotatable about and selectively connectable for rotation with the first countershaft 50. The gear 76 is rotatable about and selectively connectable for rotation with the second countershaft 52.

A fourth intermeshing gear set includes gears 78, 80, 82 and a gear 84. The gear 78 is connected for common rotation with the intermediate shaft 46. The gear 78 continuously intermeshes with both the gear 80 and the gear 82. The gear 82 continuously intermeshes with the gear 84. The gear 80 is rotatable about and selectively connectable for common rotation with the first countershaft 50. The gear 82 is an idler gear supported on a separate axis I. The gear 84 is rotatable about and selectively connectable with the second countershaft 52. The gears 60, 66, 72 and 78 are referred to herein as input driving gears. The gears 62, 64, 68, 70, 74, 76, 80, and 84 are referred to herein as input driven gears.

The transmission 18 includes a fifth intermeshing, aligned gear set that includes a gear 86 and a gear 88. The gear 86 is connected for common rotation with the second countershaft 52 and continuously intermeshes with the gear 88 which is connected for common rotation with the output member 56. A sixth intermeshing, aligned gear set includes gear a 90 which is connected for common rotation with the first countershaft 50 and a gear 92 which is connected for common rotation with the output member 56 and continuously intermeshes with the gear 90. The gears 86 and 90 are referred to herein as output driving gears and the gears 88 and 92 are referred to herein as output driven gears. The intermeshing, aligned gear set including the gears 60, 62 and 64 may be referred to as a first input gear set. The intermeshing, aligned gear set including the gears 66, 68 and 70 may be referred to as a second input gear set. The intermeshing, aligned gear set including the gears 72, 74 and 76 may be referred to a third input gear set. The intermeshing, aligned gear set including the gears 78, 80, 82 and 84 may be referred to herein as a fourth intermeshing gear set. The gear set including the gears 90, 92 may be referred to as a first output gear set and the gear set including the gears 88 and 86 may be referred to as a second output gear set. The four input gear sets utilize shared input driving gears:

the gear 60, the gear 66, the gear 72 and the gear 78. Each of the input driving gears 60, 66, 72 and 78 intermesh with gears that are connectable for rotation with each of the countershafts 50, 52. Thus, the shared input driving gears are each able to transfer torque to both of the countershafts 50, 52, the countershaft to which torque is transferred being dependent on the engagement of synchronizers, as will be described herein.

A parking gear 94 is radially-aligned with the output gear set 90, 92. Thus, the parking gear 94 is situated in what may otherwise be unused, empty space and does not require any addition to the axial length of the transmission 18.

The transmission 18 includes four pairs of back-to-back synchronizers: A, B, C and D. The back-to-back synchronizer pair A includes synchronizer A1 and a synchronizer A3. The synchronizer A1 is selectively engagable to connect the gear 64 for common rotation with the second countershaft 52. The synchronizer A3 is selectively engagable to connect the gear 70 for common rotation with the second countershaft 52. A single synchronizer selection device 96 is operable to engage either the synchronizer A1 or A3. Specifically, a synchronizer selection device 96 is shiftable to the left to engage the synchronizer A1 and shiftable to the right the engage the synchronizer A3.

The back-to-back synchronizer pair B includes a synchronizer B2 and a synchronizer BR. The synchronizer B2 is selectively engagable to connect the gear 76 for common rotation with the second countershaft 52. The synchronizer BR is selectively engagable to connect the gear 84 for common rotation with the second countershaft 52. A single synchronizer selection device 98 is operable to control engagement of both the synchronizer B2 and the synchronizer BR. Specifically, the synchronizer selection device 98 is shiftable to the left to engage the synchronizer B2 and shiftable to the right to engage the synchronizer BR.

The back-to-back synchronizer pair C includes a synchronizer C5 and a synchronizer C7. The synchronizer C5 is selectively engagable to connect the gear 62 for common rotation with the first countershaft 50. The synchronizer C7 is selectively engageable to connect the gear 68 for common rotation with the first countershaft 50. A single synchronizer selection device 100 is operable to control engagement of both the synchronizers C5 and C7. Specifically, the synchronizer selection device 100 is shiftable to the left to engage the synchronizer C5 and shiftable to the right the engage the synchronizer C7.

The back-to-back synchronizer pair D includes a synchronizer D6 and a synchronizer D4. The synchronizer D6 is selectively engagable to connect the gear 74 for common rotation with the first countershaft 50. The synchronizer D4 is selectively the synchronizers D6 and D4. Specifically, the synchronizer selection device 102 is shiftable to the left to engage the synchronizer D6 and shiftable to the right to engage the synchronizer D4.

Referring to FIG. 2, the engagement schedule of the shifting friction clutches CO and CE as well as the synchronizers is shown. As indicated in FIG. 2, seven forward gears (i.e., speed ratios) and a reverse gear (i.e., speed ratio) are achieved. Those skilled in the art will recognize that the gears shown in FIG. 1 may be designed with various tooth counts that, when the clutches and synchronizers are engaged according to the truth table of FIG. 2, will result in seven forward speed ratios and a reverse speed ratio corresponding with the seven forward gears and the reverse gear. For example, the following gear ratios may have different numerical values: First gear: tooth count gear 64/tooth count gear 60; Second gear: tooth count gear 76/tooth count gear 72; Third gear tooth count gear 70/tooth count gear 66; Fourth gear: tooth count gear 80/tooth count gear 78; Fifth gear: tooth count gear 62/tooth count gear 60; Sixth gear: tooth count gear 74/tooth count gear 72; Seventh gear: tooth count gear 68/tooth count gear 66; Reverse gear: tooth count gear 84/tooth count gear 78; First countershaft (50) output: tooth count gear 90/tooth count gear 92. Second countershaft (52) output: tooth count gear 86/tooth count gear 88; The tooth counts are selected to achieve desired speed ratios, ratio steps, and overall speed ratio.

To establish the reverse speed ratio, the clutch CE and the synchronizer BR are engaged. By engagement of the clutch CE torque is transferred from the input member 26 to the intermediate shaft 46. By engagement of the synchronizer BR torque is transferred from the intermediate shaft 44 to the second countershaft 52 via intermeshing gears 78, 82 and 84, with the gear 82 acting as an idler gear so that the gear 84 rotates in the same direction as the gear 78. Torque is transferred from the second countershaft 52 to the output member 56 via the intermeshing gears 86 and 88.

To establish the first forward speed ratio, the input friction clutch CO and the synchronizer A1 are engaged. Torque is transferred from the input member 26 to the intermediate shaft 44 via engagement of the input shifting friction clutch CO. Torque is transferred from the intermediate shaft 44 to the second countershaft 52 by engagement of synchronizer A1 through the intermeshing gears 60 and 62. Torque is transferred from the second countershaft 52 to the output member 56 via intermeshing gears 86 and 88.

To establish the second forward speed ratio, input friction shifting clutch CE and the synchronizer B2 are engaged. Torque is transferred from the input member 26 to the intermediate shaft 46 via engagement of clutch CE. Torque is then transferred from the intermediate shaft 46 to the second countershaft 52 via engagement of the synchronizer B2 through the intermeshing gears 72 and 76. Torque is transferred from the second countershaft 52 to the output member 56 via the intermeshing gears 86 and 88.

To establish the third forward speed ratio, the input friction shifting clutch CO and the synchronizer A3 are engaged. Torque is transferred from the input member 26 to the intermediate shaft 44 via engagement of the clutch CO. Torque is transferred from the intermediate shaft 44 to the second countershaft 52 via engagement of the synchronizer A3 through the intermeshing gears 66 and 70. Torque is transferred from the second countershaft 52 to the output member 56 via the intermeshing gears 86 and 88.

It will thus be appreciated that all of the four lower speed (higher numerical reduction ratios) gears ($1^{st}$, $2^{nd}$, $3^{rd}$ and Reverse) are disposed on the second countershaft 52.

To establish the fourth forward speed ratio, the input friction shifting clutch CE and the synchronizer D4 are engaged. Torque is transferred from the input member 26 to the intermediate shaft 46 via engagement of the clutch CE. Torque is transferred from the intermediate shaft 46 to the first countershaft 50 via the engagement of synchronizer D4 through the intermeshing gears 78 and 80. Torque is transferred from the first countershaft 50 to the output member 56 through the intermeshing gears 90 and 92.

A fifth forward speed ratio is established by engagement of the input friction shifting clutch CO and the synchronizer C5. Torque is transferred from the input member 26 to the intermediate shaft 44 via engagement of the clutch CO. Torque is transferred from the intermediate shaft 44 to the first countershaft 50 via engagement of the synchronizer C5 through the intermeshing gears 60 and 62. Torque is transferred from the first countershaft 50 to the output member 56 through the intermeshing gears 90 and 92.

A sixth forward speed ratio is established by engagement of the input friction shifting clutch CE and the synchronizer D6. Torque is transferred from the input member 26 to the intermediate shaft 46 via engagement of the clutch CE. Torque is transferred from the intermediate shaft 46 to the first countershaft 50 via engagement of the synchronizer D6 through the intermeshing gears 72 and 74. Torque is transferred from the first countershaft 50 to the output member 56 through the intermeshing gears 90 and 92.

A seventh forward speed ratio is established via engagement of the input friction shifting clutch CO and the synchronizer C7. Torque is transferred from the input member 26 to the intermediate shaft 44 via engagement of the input friction shifting clutch CO. Torque is transferred from the intermediate shaft 44 to the first countershaft 50 via engagement of synchronizer C7 through intermeshing gears 66 and 68. Torque is transferred from the first countershaft 50 to the output member 56 through the intermeshing gears 90 and 92.

It will thus also be appreciated that all of the four higher speed (lower numerical reduction ratio) gears ($4^{th}$, $5^{th}$, $6^{th}$ and $7^{th}$) are disposed on the first countershaft 50. This arrangement of higher speed gears on the first countershaft 50 and lower speed gears on the second countershaft 52 is facilitated by the difference in center to center distances between the axes of the first and second countershafts 50, 52 and the common axis of the two intermediate shafts 44 and 46. In FIG. 1, this greater distance "X" between the axis of the second countershaft 52 and the common axis of the two intermediate shafts 44 and 46 is illustrated and contrasted with the smaller distance "Y" between the axis of the first countershaft 50 and the common axis of the two intermediate shafts 44 and 46. This arrangement also assists maintenance of reasonable torque and speed ratios on the ratio gears. Distributing the overall gear state ratio, i.e., that overall gear ratio between the input member 26 (or the intermediate shafts 44 and 46) and the output member 56, between the ratio and transfer gearsets allows for smaller gear diameter packaging than an arrangement that develops all the gear state ratios in one gearset.

Figure 3:
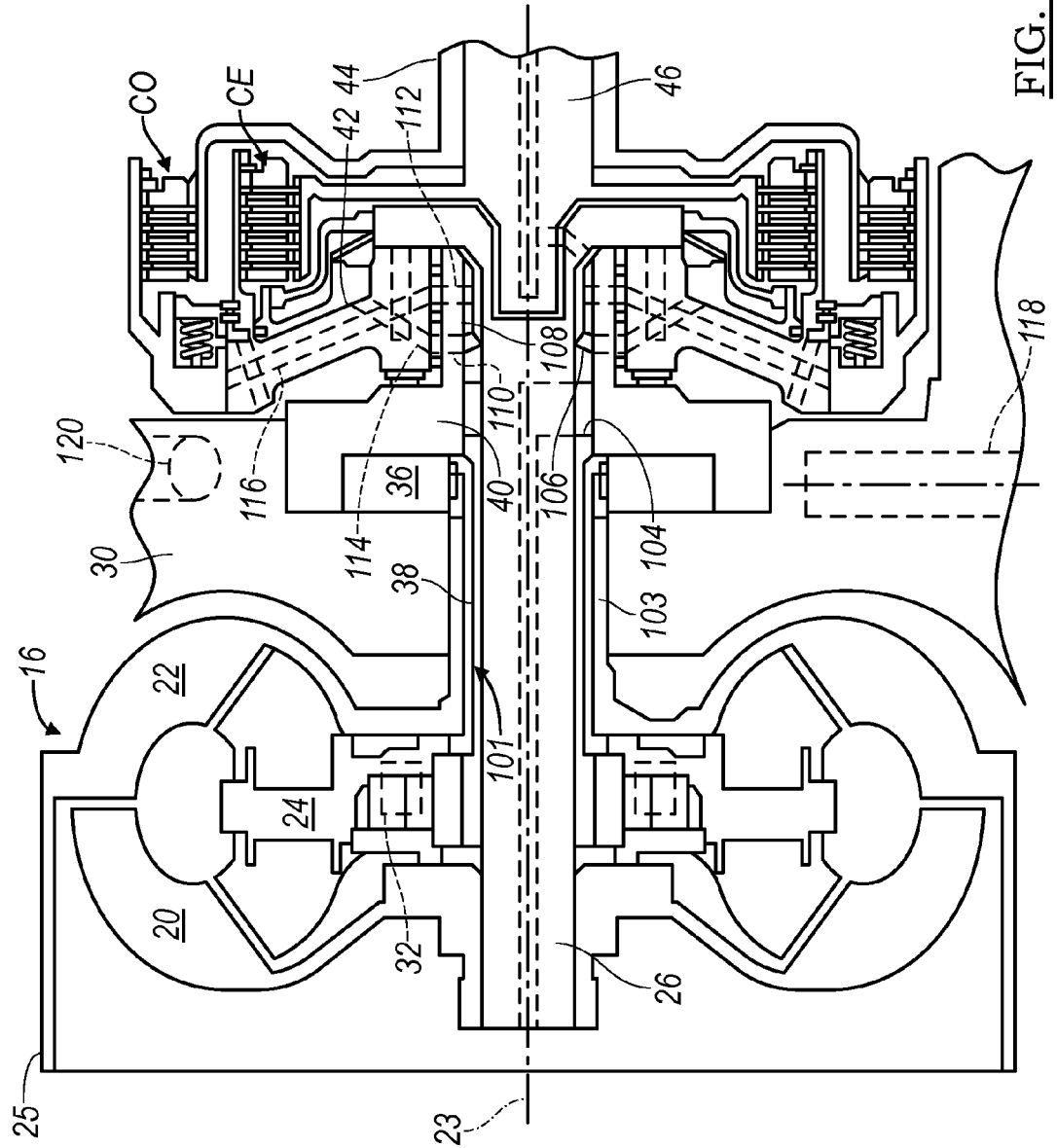
FIG. 3 is a partial schematic fragmentary illustration of the torque converter, oil pump and friction shifting clutches of the powertrain of FIG. 1, showing a clutch hub, a clutch hub support member and a stator shaft support member that enable routing of oil from the oil pump to the torque converter and to the friction shifting clutches.

Referring now to FIG. 3, the torque converter 16, the pump 36, the stationary clutch hub support member 40, the clutch hub 42 and the stator support shaft 38 are shown in greater detail. The transmission oil pump 36 is operatively connected to the pump portion 22 of the torque converter 16 and to the engine output member 23 via pump portion hub member 25. The stator portion 24 is operatively connected to the stator support shaft 38 which is connected with the stationary clutch hub support member 40. The transmission housing 30 is bolted or otherwise connected with the stationary member clutch hub support member 40. Thus, the pump 36 is radially-outward of the stator support shaft 38 and is radially-inward of and supported by the stationary clutch hub support member 40.

The turbine portion 20 is operatively connected for rotation with the input member 26. The input member 26 in turn is operatively connected for rotation with the clutch hub 42. The clutch hub 42 supports a portion of the friction input shifting clutches CO and CE. The friction input shifting clutch CO has another portion operatively connected for rotation with the intermediate shaft 44. The friction input shifting clutch CE has another portion operatively connected for rotation with intermediate shaft 46. Engagement of the clutch CO connects the input member 26 and the clutch hub 42 for rotation with the intermediate shaft 44. Engagement of the clutch CE connects the input member 26 and the clutch hub 42 for rotation with the intermediate shaft 46.

Transmission oil from pump the 36 is routed to the torque converter 16 and to the friction shifting clutches CO and CE. Torque converter clutch apply oil is routed from the pump 36 to the torque converter 16 via a sleeve passage 101 which is an annular passage between the pump portion sleeve shaft 103 and the stator support shaft 38. The pump portion sleeve shaft 103 operatively connects the pump portion 22 to the pump 36. Torque converter clutch release oil is also routed to the torque converter 16 through a stator support shaft passage 104 in the stator support shaft 38. The oil makes its way from the pump 36 to the stator support shaft passage 104 through a horizontally running crevice 108 between the stationary clutch hub support member 40 and the stator support shaft 38. Lubrication oil for gears supported on the intermediate shafts 44 and 46 is delivered via a lubrication passage 106.

The stationary clutch hub support member 40 also has clutch hub support member passages 110 and 112 formed therein to direct clutch apply oil from the pump 36 via the horizontal crevice 108 to clutch hub passages 114 and 116. The clutch hub 42 also has additional passages (not shown) in fluid communication with one another for delivering dam oil to the clutches CO and CE. These additional dam oil passages are located in a different radial plane than the passages 114 and 116. The clutch hub passage 114 directs oil to the input friction clutch CE and the clutch hub passage 116 directs oil to the input friction clutch CO.

The passage 118 is an oil supply to the pump 36 in the housing 30 and is fluidly communicable with a filter (not shown) through which oil is supplied to the pump 36. Multiple valves, represented by a valve 120, control oil flow through passages 101, 104, 106, 108, 110, 112, 114 and 116 and communicate with one or more valve bodies (not shown).

Thus, the unique packaging of the oil pump 36 adjacent the clutch hub 42 enables a relatively simple cooling circuit for the friction shifting clutches CO and CE through the stationary clutch hub support member passages 110, 112 and the clutch hub passages 114, 116. During assembly of the transmission 18, the clutch hub 42 is piloted over the stationary hub support member 40, which serves to partially support both the clutch hub 42 and the pump 36.

While the best modes for carrying out the invention have been described in detail, those familiar with the art to which this invention relates will recognize various alternative designs and embodiments for practicing the invention within the scope of the appended claims.

The invention claimed is:

1. An automatic transmission for a motor vehicle, comprising, in combination:
   an input member;
   a first and a second concentrically disposed intermediate shaft;
   a first and a second friction clutch alternately selectively engageable for operatively connecting said input member to said respective first and second intermediate shafts;
   a first and a second countershaft;
   a first driving input gear coupled for rotation with said first intermediate shaft and meshing with a first pair of driven input gears each connectable for rotation with a respective one of said countershafts for transferring torque to one of said countershafts when said first friction clutch is engaged;
   a second driving input gear coupled for rotation with said second intermediate shaft and meshing with a second pair of driven input gears each connectable for rotation with a respective one of said countershafts for transferring torque to one of said countershafts when said second friction clutch is engaged;
a third driving input gear coupled for common rotation with said first intermediate shaft and meshing with a third set of driven input gears each connectable for common rotation with a respective one of said countershafts for transferring torque to one of said countershafts when said first friction clutch is engaged;
a fourth driving input gear coupled for common rotation with said second intermediate shaft and meshing with a fourth set of driven input gears each connectable for common rotation with a respective one of said countershafts for transferring torque to one of said countershafts when said second friction clutch is engaged;
a plurality of synchronizers operatively disposed between said driven input gears and said countershafts, and a spacing between an axis of said intermediate shafts and said countershaft associated with lower speed gears is greater than a distance between said axis and said countershaft associated with higher speed gears.

2. The automatic transmission of claim 1 further including a torque converter having an input and an output driving said input member.

3. The automatic transmission of claim 1 wherein higher speed gears are associated with said first countershaft.

4. The automatic transmission of claim 3 wherein said higher speed gears are fourth, fifth, sixth and seventh.

5. The automatic transmission of claim 1 wherein lower speed gears are associated with said second countershaft.

6. The automatic transmission of claim 5 wherein said lower speed gears are first, second, third and reverse.

7. An automatic transmission for a motor vehicle comprising, in combination:
an input member defining an input axis and an output member disposed on said input axis;
first and second concentrically disposed intermediate shafts;
first and second selectively engageable friction clutches for coupling said input member to one of said first and said second intermediate shafts;
first and second countershafts;
a first plurality of meshing gear pairs, one of each said first pairs of gears disposed for free rotation about said first countershaft and another of each of said first pairs of gears coupled to one of said intermediate shafts;
a first plurality of sychronizers for selectively and exclusively coupling said one of said first pairs of gears to said first countershaft,
a second plurality of meshing gears pairs, one of each of said second pairs of gears disposed for free rotation about said second countershaft and another of each of said second pairs of gears coupled to one of said intermediate shafts; and
a second plurality of sychronizers for selectively and exclusively coupling said one of said second pairs of gears to said second countershaft,
wherein a distance between said first countershaft and an axis of said intermediate shafts is greater than a distance between said second countershaft and said axis, and
wherein said first plurality of meshing gears provide lower speed gear ratios and said second plurality of gears provide higher speed gear ratios.

8. The automatic transmission of claim 7 wherein said lower speed gear ratios are first, second, third and reverse and said higher speed gear ratios are fourth, fifth, sixth and seventh.

9. The automatic transmission of claim 7 further including a torque converter having an input and an output driving said input member.

10. The automatic transmission of claim 9 further including an engine having an output driving said input of said torque converter.

11. The automatic transmission of claim 7 including eight pairs of said meshing gears providing seven forward gear ratios and a reverse gear ratio.

12. An automatic transmission for a motor vehicle comprising, in combination,
a torque converter having an input and an output;
first and second concentrically disposed intermediate shafts defining an input axis;
an output shaft having an output axis coaxial with said input axis,
first and second friction clutches alternately selectively engageable for coupling said output of said torque converter to one of said first and second intermediate shafts;
first and second countershafts;
a first plurality of meshing gear pairs, one of each said first pairs of gears disposed for free rotation about said first countershaft and another of each of said first pairs of gears coupled to one of said intermediate shafts,
a first plurality of sychronizers for selectively and exclusively coupling said one of said first pairs of gears to said first countershaft;
a second plurality of meshing gears pairs, one of each of said second pairs of gears disposed for free rotation about said second countershaft and another of each of said second pairs of gears coupled to one of said intermediate shafts; and
a second plurality of sychronizers for selectively and exclusively coupling said one of said second pairs of gears to said second countershaft,
said first plurality of meshing gears providing higher speed gear ratios and said second plurality of gears providing lower speed gear ratios,
wherein a distance between said first countershaft and an axis of said intermediate shafts is less than a distance between said second countershaft and said axis.

13. The automatic transmission of claim 12 wherein said lower speed gear ratios are first, second, third and reverse and said higher speed gear ratios are fourth, fifth, sixth and seventh.

14. The automatic transmission of claim 12 further including an engine having an output driving said input of said torque converter.

15. The automatic transmission of claim 12 including eight pairs of said meshing gears providing seven forward gear ratios and reverse.

16. An automatic transmission for a motor vehicle, comprising, in combination:
an input member;
a first and a second concentrically disposed intermediate shaft;
a first and a second friction clutch alternately selectively engageable for operatively connecting said input member to said respective first and second intermediate shafts;
a first and a second countershaft;
a first driving input gear coupled for rotation with said first intermediate shaft and meshing with a first pair of driven input gears each connectable for rotation with a respective one of said countershafts for transferring torque to one of said countershafts when said first friction clutch is engaged;

a second driving input gear coupled for rotation with said second intermediate shaft and meshing with a second pair of driven input gears each connectable for rotation with a respective one of said countershafts for transferring torque to one of said countershafts when said second friction clutch is engaged;

a third driving input gear coupled for common rotation with said first intermediate shaft and meshing with a third set of driven input gears each connectable for common rotation with a respective one of said countershafts for transferring torque to one of said countershafts when said first friction clutch is engaged;

a fourth driving input gear coupled for common rotation with said second intermediate shaft and meshing with a fourth set of driven input gears each connectable for common rotation with a respective one of said countershafts for transferring torque to one of said countershafts when said second friction clutch is engaged; and wherein a spacing between an axis of said intermediate shafts and said countershaft associated with lower speed gears is greater than a distance between said axis and said countershaft associated with higher speed gears.

* * * * *